United States Patent
Zittel et al.

(10) Patent No.: US 6,419,094 B1
(45) Date of Patent: *Jul. 16, 2002

(54) FIXED SEQUENTIAL SPRAYER FOR A CYLINDRICAL WASTEWATER SCREEN

(75) Inventors: David R. Zittel; Daniel D. Maupin, both of Columbus; Theodore J. Long, Jr., Madison, all of WI (US)

(73) Assignee: Lyco Manufacturing, Inc., Columbus, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/690,287

(22) Filed: Oct. 17, 2000

Related U.S. Application Data

(63) Continuation-in-part of application No. 09/500,860, filed on Feb. 9, 2000, now Pat. No. 6,182,833.

(51) Int. Cl.$^7$ .............................................. B01D 35/16
(52) U.S. Cl. .................... 210/393; 210/394; 210/403; 210/412
(58) Field of Search ................................ 210/393, 394, 210/402, 403, 411, 412

(56) References Cited

U.S. PATENT DOCUMENTS

| | | | |
|---|---|---|---|
| 4,869,823 A | * | 9/1989 | Otani et al. ................. 210/403 |
| 5,433,849 A | | 7/1995 | Zittel .......................... 210/338 |
| 5,443,737 A | * | 8/1995 | Fjallstrom et al. .......... 210/412 |
| 5,490,924 A | * | 2/1996 | Macia et al. ................. 210/411 |
| 5,665,232 A | * | 9/1997 | Schlegal ...................... 210/411 |
| 6,182,833 B1 | * | 2/2001 | Zittel .......................... 210/394 |
| 6,186,340 B1 | * | 2/2001 | Hirs ............................. 210/394 |

* cited by examiner

*Primary Examiner*—Christopher Upton
(74) *Attorney, Agent, or Firm*—Nilles & Nilles SC

(57) ABSTRACT

An apparatus for cleaning a rotating cylindrical wastewater screen of the type formed of tubular perforate wedgewire. The apparatus includes a frame, a rotatable cylindrical screen carried by the frame and having an axis of rotation and which is defined by a tubular perforate wedgewire sidewall having an interior wedgewire surface and an exterior wedgewire surface, a wastewater conduit having an opening disposed inside the wedgewire sidewall through which conduit effluent is discharged, a plurality of spray nozzles positioned along the length of the cylindrical screen from which fluid is ejected against the wedgewire sidewall to dislodge solids from the wedgewire sidewall, a control system coupled to the plurality of spray nozzles that controls the order that each nozzle of the plurality of spray nozzles ejects fluid and controls a duration of time that each nozzle of the plurality of nozzles ejects fluid, and a pump in fluid flow communication with a supply of the fluid for delivering the fluid to the plurality of spray nozzles.

12 Claims, 7 Drawing Sheets

FIXED SEQUENTIAL SPRAYER FOR A CYLINDRICAL WASTEWATER SCREEN

This application is a continuation-in-part of U.S. application Ser. No. 09/500,860, filed Feb. 09, 2000, now U.S. Pat. No. 6,182,833 B1.

FIELD OF THE INVENTION

The present invention relates to cylindrical-type wastewater screens and more particularly to a sprayer for cleaning the cylindrical screen during operation.

BACKGROUND OF THE INVENTION

Presently, wastewater is a byproduct of many industrial processes that use water. For example, the food industry relies rather heavily on water for processing food. Water is used to clean vegetables, beef, fish, poultry, and other types of food often before the food is cooked, blanched or sterilized using other water. Unfortunately, after all this water is used it typically must also be processed to clean it so it can be either reused or inexpensively disposed. As a result of rather restrictive environmental laws and regulations that have made disposal of unprocessed wastewater prohibitively expensive, wastewater processing or preprocessing at the site of the food processing facility is desirable.

One apparatus that has proved particularly effective at treating wastewater is a cylindrical-type wastewater screen and such is shown and described in my U.S. Pat. No. 5,433,849, issued Jul. 18, 1995. As shown in that patent, a cylindrical-type wastewater screen has a cylindrical screen, typically comprised of perforate wedgewire, into which the wastewater is introduced while the screen is rotated. The wastewater passes radially outwardly through the screen after which it can be reused, further filtered, or disposed. Solids entrained in the wastewater that were filtered out of the wastewater can be cheaply disposed of as landfill or fertilizer. As shown, two cylindrical-type screens having successively finer screen media can be concentrically arranged to provide staged treatment of wastewater.

During operation, wastewater introduced within the cylindrical screen passes radially outwardly through perforations in the screen while most of the solids entrained in the wastewater is filtered by and retained in the screen because the perforations typically are no greater than about ten to twenty thousandths of an inch. The filtered solids often cling to the screen and the screen is rotated to cause gravity to encourage the solids to separate from the screen and fall to the bottom of the screen. A small flow of wastewater at the bottom of the screen carries the solids from the screen helping to keep the screen clean.

Many times, sticky solids, such as fat, connective tissue, coatings, starch, and other sticky residue will continue to cling to the screen despite rotation of the screen. The sticky solids can also cause other solids in the wastewater to stick to it and in general will significantly reduce the efficiency of the screen by partially or completely plugging perforations. Should too many perforations become plugged, the screen will have to be taken offline and cleaned.

Presently, to help keep the screen clean to prevent too many perforations from becoming plugged, fixed or stationary nozzles carried by a manifold which is disposed adjacent the screen can discharge cold water, hot water, steam or even air forcefully against the screen. Several spaced apart nozzles must be used to clean the screen along its entire axial length. Unfortunately, where water is used, each nozzle typically requires a flow of as much as about 3 gallons per minute such that a typical screen can use as much as 30 to 90 gallons of water per minute, depending on the number of nozzles required and the type of screening apparatus used. For example, where a double cylinder wastewater screen is used, such as is disclosed in U.S. Pat. No. 5,433,849 to Zittel, as many as 30 nozzles fixed to at least two manifolds are used to keep both cylinders clean. While the frequency of cleaning can vary with the type of solids entrained in the wastewater, each cleaning cycle nonetheless uses a lot of water which undesirably increases wastewater treatment costs.

While reciprocating sprayers have been used in some types of similar processing equipment, they have not been viewed as particularly well suited for use in cylindrical-type because of reliability considerations and because of concern they could not effectively clean the rather small perforations found in wastewater screens. For example, it is known to use a reciprocating sprayer to direct water against a perforate cylinder of a bean snipper to free the perforations of bean parts that have become lodged in them. However, the perforations in the cylinder of a bean snipper are much larger, typically at least $13/64$ (0.203) of an inch, the cylinder is made of polycarbonate, and a bean snipper is used to cut beans, not process wastewater. Moreover, it is not believed that the reciprocating sprayer used in bean snippers discharges water at a great enough pressure to completely pass through the exterior of the screen adjacent the sprayer and impact against the interior of the screen on the opposite side. Additionally, reciprocating sprayers can incorporate a rodless air cylinder system that uses an air cylinder. Such a system can require a sufficiently clean supply of air that may not be available at a plant utilizing a reciprocating sprayer.

SUMMARY OF THE INVENTION

The present invention provides an apparatus for screening wastewater. The apparatus for screening wastewater includes a frame, a rotatable cylindrical screen carried by the frame and having an axis of rotation and which is defined by a tubular perforate wedgewire sidewall having an interior wedgewire surface and an exterior wedgewire surface, and a wastewater conduit having an opening disposed inside the wedgewire sidewall through which conduit effluent is discharged. The apparatus for screening wastewater further includes a plurality of spray nozzles positioned along the length of the cylindrical screen from which fluid is ejected against the wedgewire sidewall to dislodge solids from the wedgewire sidewall, a control system coupled to the plurality of spray nozzles that controls the order that each nozzle of the plurality of spray nozzles ejects fluid and controls a duration of time that each nozzle of the plurality of nozzles ejects fluid, and a pump in fluid flow communication with a supply of the fluid for delivering the fluid to the plurality of spray nozzles.

The plurality of nozzles can eject fluid under pressure sufficient to impinge against and pass through the outer surface of the wedgewire sidewall and then impinge against an inner surface of the wedgewire sidewall such that solids are dislodged at both regions of impingement. The plurality of spray nozzles can also eject fluid at a pressure of at least about 80 to 1000 psi. The plurality of spray nozzles can additionally eject fluid at a volume of about 5 to 20 gallons per minute based on the size of the screen and based on the water pressure supplied. The wedgewire sidewall of said cylinder can have openings of 10 to 20 thousands of an inch.

The apparatus for screening wastewater can further include a second cylindrical screen that is comprised of a tubular perforate wedgewire sidewall wherein the fluid from the plurality of spray nozzles is under sufficient pressure that it impinges against and passes through the outer surface of the cylindrical screen, the outer surface of the second cylindrical screen, the inner surface of the second cylindrical screen, and the inner surface of an opposite side of the cylindrical screen. The sprayer can be disposed about 4 to 6 inches away from the outer sidewall of the cylindrical screen. The plurality of spray nozzles can be arranged so that the fluid ejected from the spray nozzles against the wedgewire sidewall provides complete coverage of the cylindrical screen along the axis of rotation.

The apparatus for screening wastewater can further include a plurality of electrically actuated valves coupled to the plurality of spray nozzles positioned along the length of the cylindrical screen, wherein the controller can control the operation of the electrically actuated values to provide fluid to the plurality of spray nozzles. The valves can open and close in sequence to eject fluid from the spray nozzles to sequential areas of the cylindrical screen.

The apparatus for screening wastewater can further include a plurality of spray manifolds coupled to the plurality of spray nozzles, wherein each of the plurality of spray manifolds can be coupled to at least one of the plurality of spray nozzles. The apparatus for screening wastewater can further include an operator interface coupled to the control system.

BRIEF DESCRIPTION OF THE DRAWINGS

At least one preferred exemplary embodiment of the invention is illustrated in the accompanying drawings.

DETAILED DESCRIPTION OF THE PREFERRED EMBODIMENTS

Figure 1:
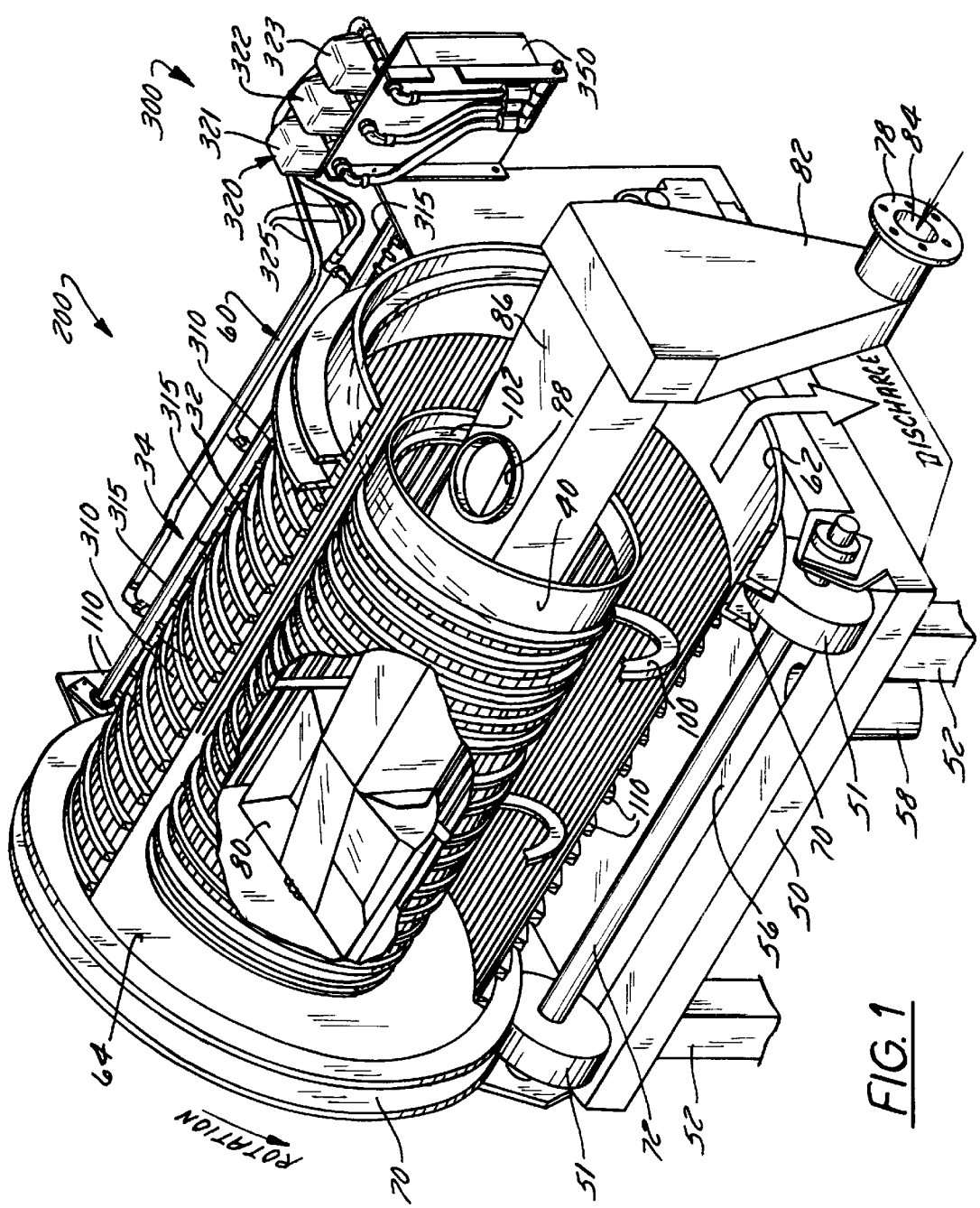
FIG. 1 is a perspective view of an exemplary apparatus for screening wastewater, certain parts being shown as broken away or removed for the sake of clarity in the drawings.

FIG. 1 shows an exemplary double cylindrical wastewater screen apparatus for cleaning wastewater 200 according to a preferred embodiment. The wastewater is introduced to the lower right-hand side of the machine via inlet 84 and conducted into the center of the inner cylindrical screen via conduit 82. The general organization and function of the machine shown in FIG. 1 is described in some detail in U.S. Pat. No. 5,433,849, issued Jul. 18,1995, and reference may be had to that patent which forms a part of this specification. However, the following detailed description of the drum-type wastewater screen and apparatus is sufficient for purposes of describing the present invention as follows.

Figure 2:
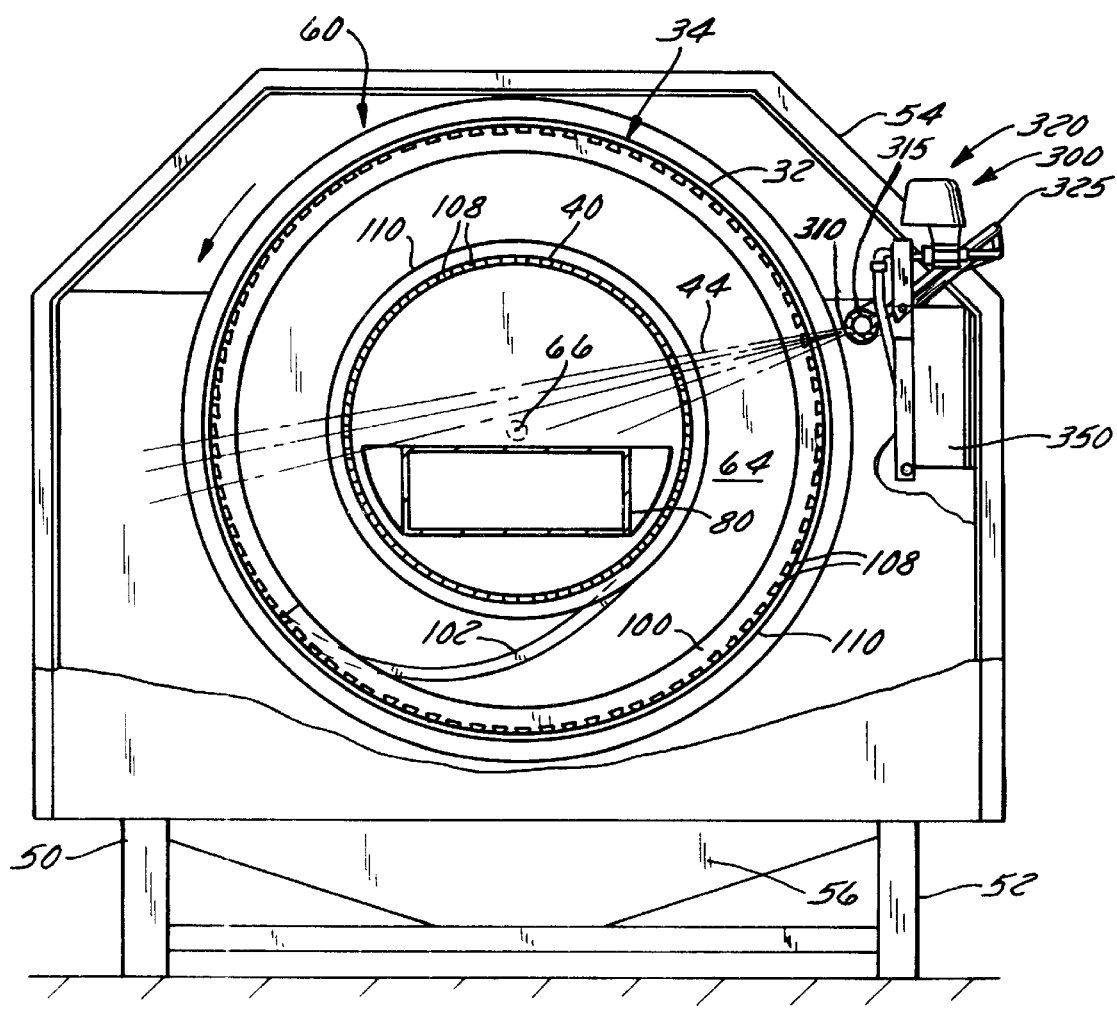
FIG. 2 is a transverse cross-sectional view, being more or less schematic in nature with certain parts removed, of the apparatus for screening wastewater shown in FIG. 1.
Figure 3:
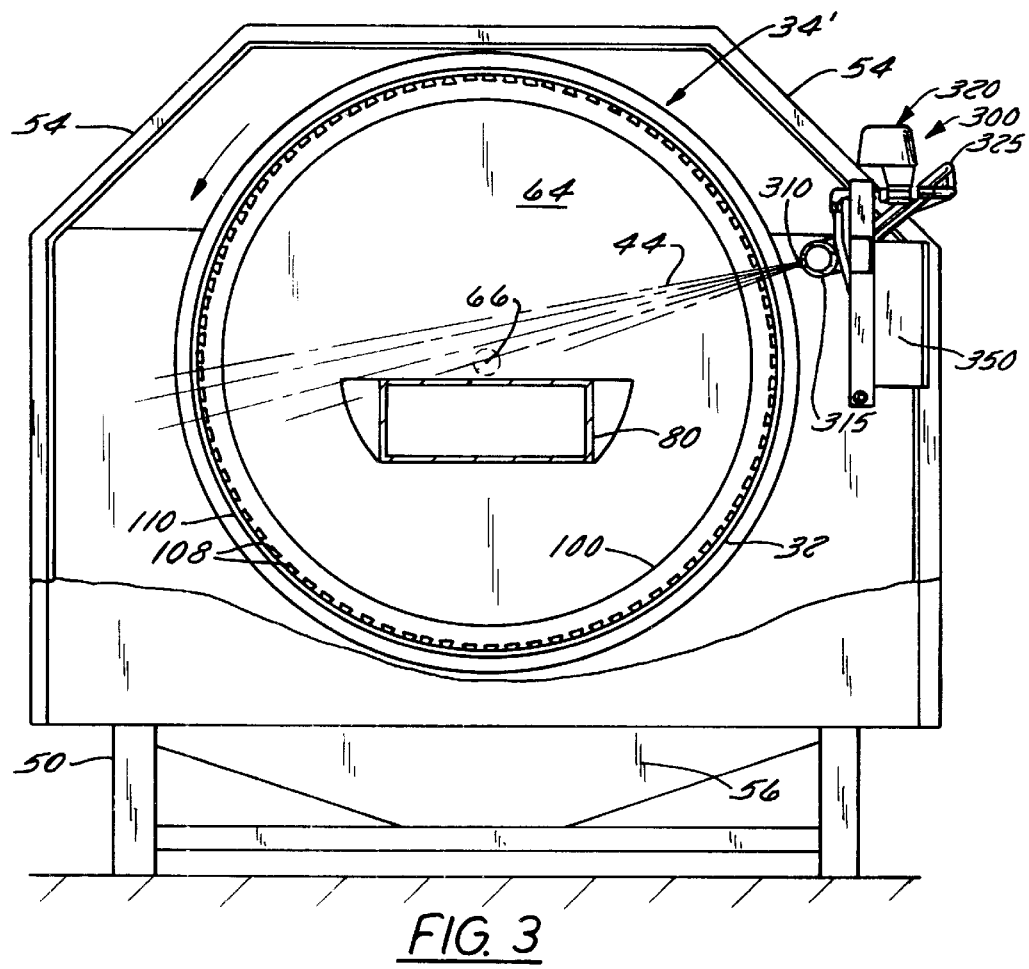
FIG. 3 is a view similar to FIG. 2 but showing a single cylinder arrangement.

The apparatus for cleaning a wastewater 200 includes a fixed sprayer 300 (FIGS. 1–3 and 6–8) for cleaning cylindrical perforate screens 32 and 40 of a wastewater screening apparatus 34. The sprayer 300 has nozzles 310 (FIGS. 2, 3, and 6–9) that discharge a fluid 44 against the outer screen 32 (FIGS. 2, 3). Solids 46 (FIG. 4) which stick to or are attached to interior surfaces of the screens 32 and 40 are dislodged from the screens by the fluid 44 as the fluid 44 passes through the screens 32 and 40.

The screening apparatus 34 is mounted on a frame 50 (FIG. 1) that carries the concentrically arranged screens 32, 40 and has legs 52 that space the apparatus above the ground. Also carried by the frame 50 is a housing 54 (FIGS. 2, 3) that encompasses the screens and the sprayer 30. Four rollers 51 (FIGS. 1, 4) rotationally support the screens 32 and 40 and are driven by a motor and conventional belt and pulleys (not shown). Disposed below the screens is a trough 56 (FIGS. 1, 2, 4) that serves as a collection pan for collecting the wastewater after it has passed through the screens. The trough 56 has a drain 58 (FIGS. 1, 4) through which the screened wastewater is discharged. Collectively, the housing 54 and trough 56 ensure that the wastewater, as well as cleaning fluid (where the fluid is a liquid), is retained within the screening apparatus.

The inner screen 40 and outer screen 32 are part of a double screen assembly 60 (FIGS. 1, 2, 4) that includes two cylindrical screens 32 and 40. FIG. 3 shows a single cylindrical screen arrangement. There is an effluent discharge end 62 (FIGS. 1, 4) at one end that preferably is at least partially open so that solids 46 screened from the wastewater can be discharged from the apparatus. To catch solids 46 filtered from the wastewater, there is a second trough 63 (FIG. 4) disposed below the screen assembly 60 adjacent the effluent discharge end 62. To help urge solids 46 toward the effluent discharge end 62, each screen preferably has a generally spiral-shaped or helical auger 100, 102 (FIGS. 1, 2, 4) inside the screen that preferably can be fixed to the screen.

Figure 4:
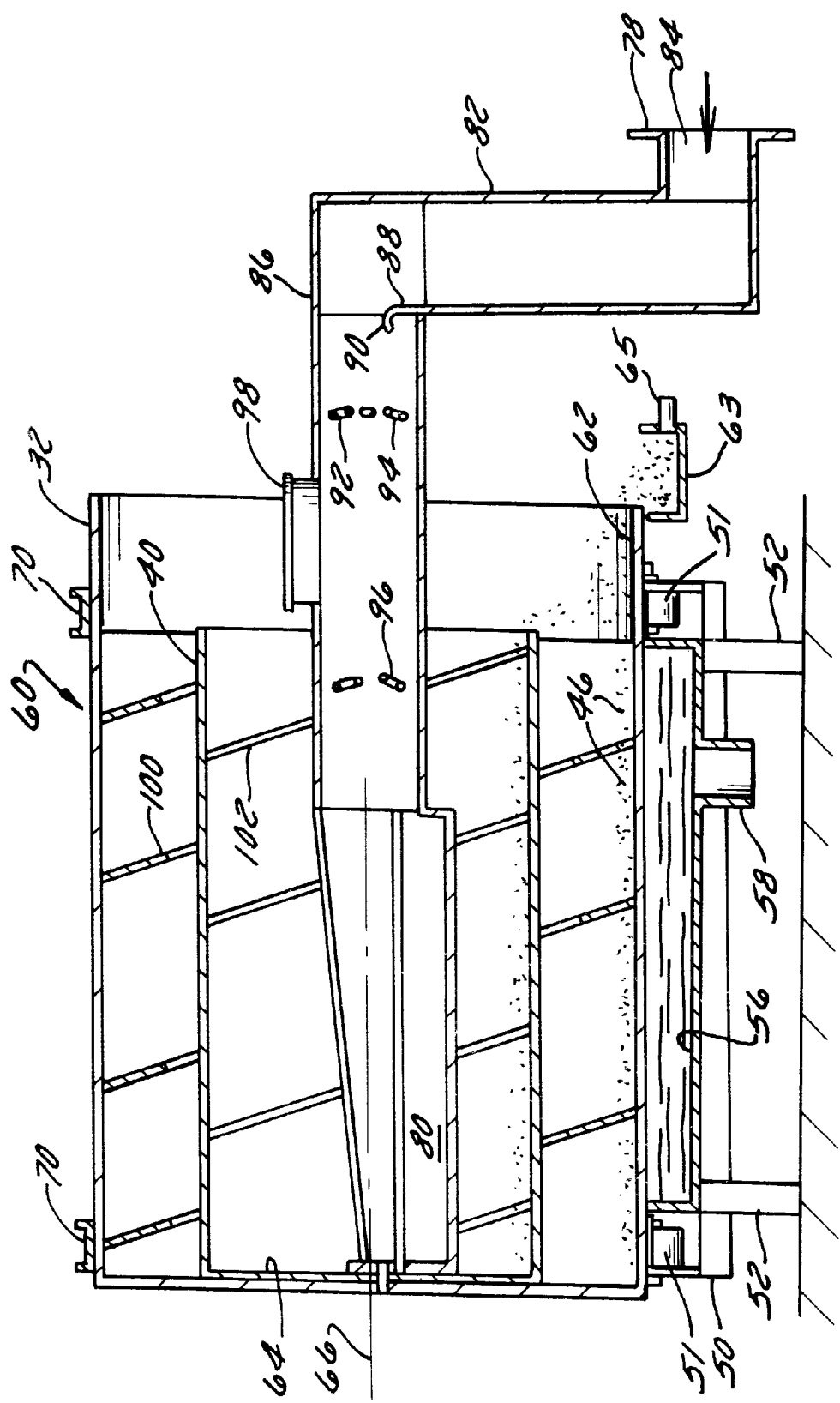
FIG. 4 is a longitudinal sectional view through the apparatus for screening wastewater shown in FIG. 1 being more or less schematic in nature, with certain parts removed for the sake of clarity.

The screen assembly 60 preferably is closed at its end opposite the discharge end by a disc-shaped drum head 64 (FIGS. 1, 4) to which one or both cylindrical screens 32, 40 preferably are fixed. In a preferred embodiment, such as is shown in FIGS. 1 and 4, both screens are fixed to the head 64 for rotation in unison therewith about a longitudinal axis of rotation 66 that preferably is a common axis of rotation. The outer screen 32 of the screen assembly 60 is rotatively supported on the frame by rollers or trunnions 51 (FIGS. 1, 4) that are received in spaced apart channels 70 or the like carried by the outer screen 32. As is shown in FIGS. 1 and 4, a preferred embodiment of the apparatus has two pairs of spaced apart rollers or trunnions 51 with each pair of trunnions carried by an axle 72 journaled for rotation to the frame.

Wastewater to be cleaned is delivered to the machine as follows. A wastewater infeed 78 (FIGS. 1, 4) has an outlet 80 disposed inside the inner screen 40 for introducing the wastewater to be screened to the inner screen 40. Where the screening apparatus 32 is of single screen construction, such as is depicted in FIG. 3, the infeed outlet 80 is disposed inside of screen 32 and directly introduces the wastewater therein.

In a preferred embodiment, the infeed 78 includes a vertical conduit or column 82 (FIGS. 1, 4) that communicates liquid to be screened from its inlet 84 to a generally horizontally extending conduit or trough 86 where the wastewater is discharged from the outlet 80 (FIGS. 1, 4) into the screen. The outlet 80 preferably is located adjacent the closed end (to the left in FIG. 1) of the screen assembly and each screen can be inclined such that the closed end is disposed at least slightly above the effluent discharge end to help spread the flow of wastewater more evenly over the entire axial length of each screen 32 and 40 and to help encourage flow of solids 46 out the discharge end. As is shown in FIG. 4, to help smooth flow of wastewater inside the infeed 78, the infeed has an internal weir 88 with a lip 90 and a number of spaced apart internal baffles 92, 94 and 96. To facilitate cleaning of the infeed, the horizontal conduit 86 can be equipped with a clean-out port 98.

Figure 5:
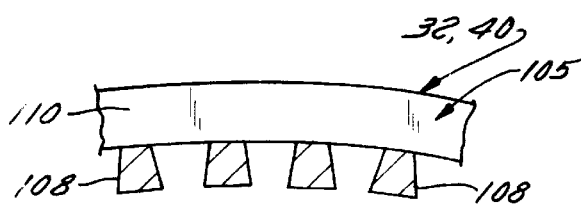
FIG. 5 is a fragmentary, enlarged view of the outer and also of the inner concentric wedgewire cylinders.

FIG. 5 depicts a fragmentary enlarged cross section of the outermost screen 32 and also the screen 40. Preferably, each screen is comprised of wedgewire screens 105 which are less subject to becoming plugged or jammed than other types of screens. Each wedgewire screen is comprised of a plurality of wires 108 that are arranged to form a cylinder and which are held captive by spaced apart bands 110 that extend about the circumference of the screen. In a preferred embodiment, each wire 108 and band 110 is constructed of a metal that preferably is made of stainless steel.

Wire 108 has a preferred wire configuration of generally triangular or truncated triangular cross section. Where each axially extending wire 108 is of generally triangular or truncated triangular cross section, the base of each triangle formed is disposed (as shown in FIG. 5) toward the interior of the screen. In a typical screen arrangement, there are several circumferentially arranged bands 110 that are affixed to the wires to help form them into a screen that is a drum or cylinder. The wires 108 extend axially and the bands 110 circumferentially around the exterior of the wires.

The spacing between each pair of adjacent wires 108 is selected to permit liquid to flow therebetween while blocking solids 46 having a size about the same or bigger than the spacing. In a preferred embodiment, where the screen apparatus is a double-cylinder screen, the spacing between adjacent wires of the inner screen 40 is greater than the spacing between adjacent wires of the outer screen 32. In a preferred double-cylinder embodiment, the wire-to-wire spacing of the inner drum 40 range from between about 0.040 inches and about 0.060 inches and the wire-to-wire spacing of the outer drum 32 range from between about 0.010 inches and about 0.020 inches depending upon the type and size of solids likely to be encountered. Where the apparatus 34' (FIG. 3) is of single screen construction, the wire-to-wire spacing of the screen 32 ranges between about 0.030 inches and about 0.060 inches.

The outer screen 32 has an inner diameter of at least about 24 inches and typically no greater than about 60 inches and is at least about 48 inches long and no greater than about 168 inches long. Where the screen apparatus is a double drum screen, the inner screen 40 has an inner diameter of at least about 12 inches and typically no greater than about 48 inches and is at least about 24 inches long and no greater than about 60 inches long.

Figure 6:
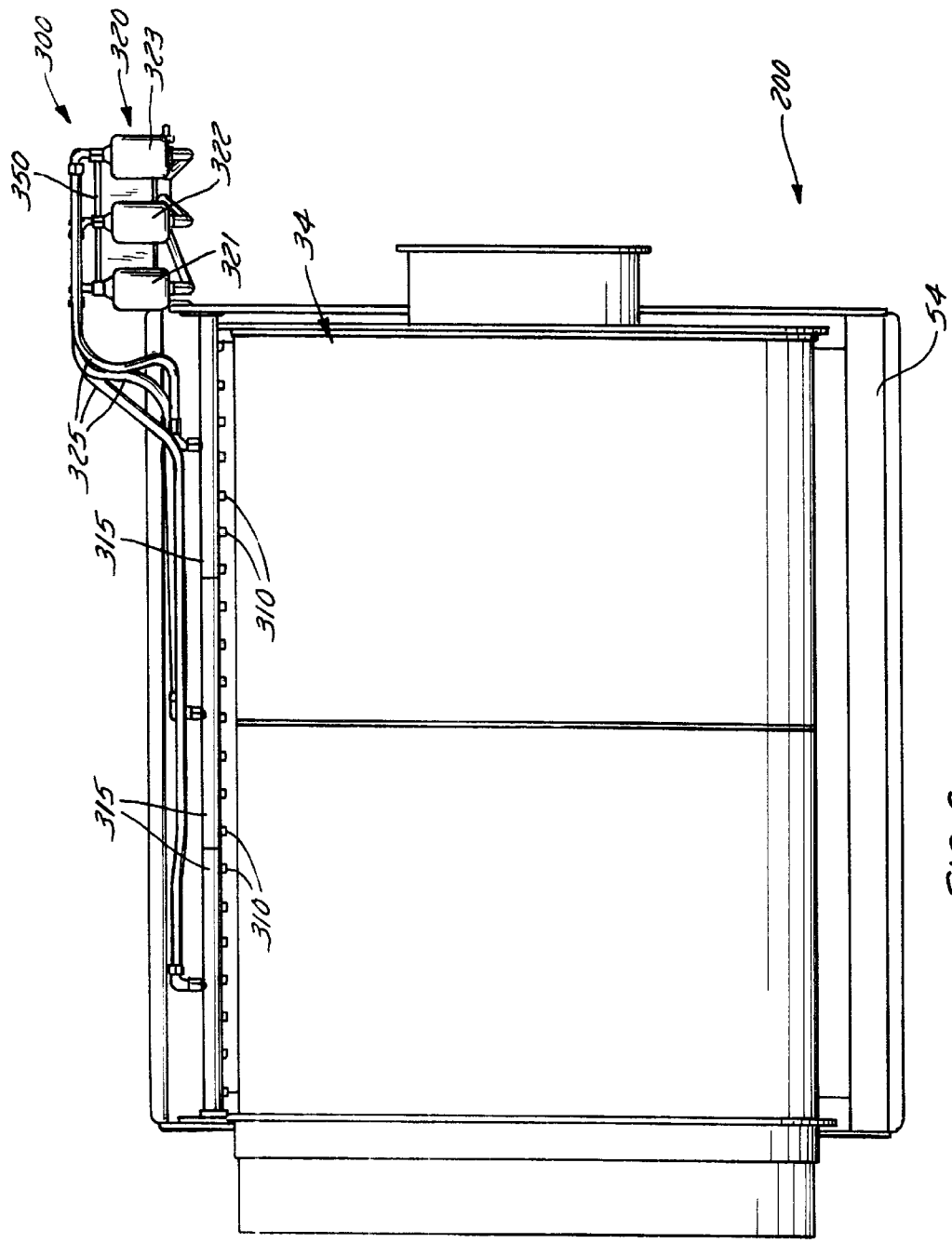
FIG. 6 is a longitudinal sectional view of the apparatus for screening wastewater shown in FIG. 1, with certain parts removed to highlight the sprayer according to a preferred embodiment.

FIG. 6 is a longitudinal sectional view of the apparatus for screening wastewater 200 shown in FIG. 1, with certain parts removed to highlight the sprayer 300 according to an exemplary embodiment. The sprayer 300 includes spray nozzles 310, spray manifolds 315, electrically actuated valves 320 and hoses 325. The valves 320 can include valves 321, 322 and 323. As illustrated in FIGS. 2, 3, 4, and 6, the sprayer discharges a fluid, such as water, air, or the like, against the outer screen 32. Solids 46 which stick to or are attached to surfaces of the screens 32 and 40 are dislodged from the screens by the fluid 44 as the fluid 44 passes through the screens 32 and 40. In operation, the valves 320 are actuated to allow the fluid 44 to flow through the hoses 325 to the spray manifolds 315. The spray manifolds 315 distribute the fluid 44 to the spray nozzles 310 to spray the fluid 44 against the screens 32 and 40.

Figure 8:
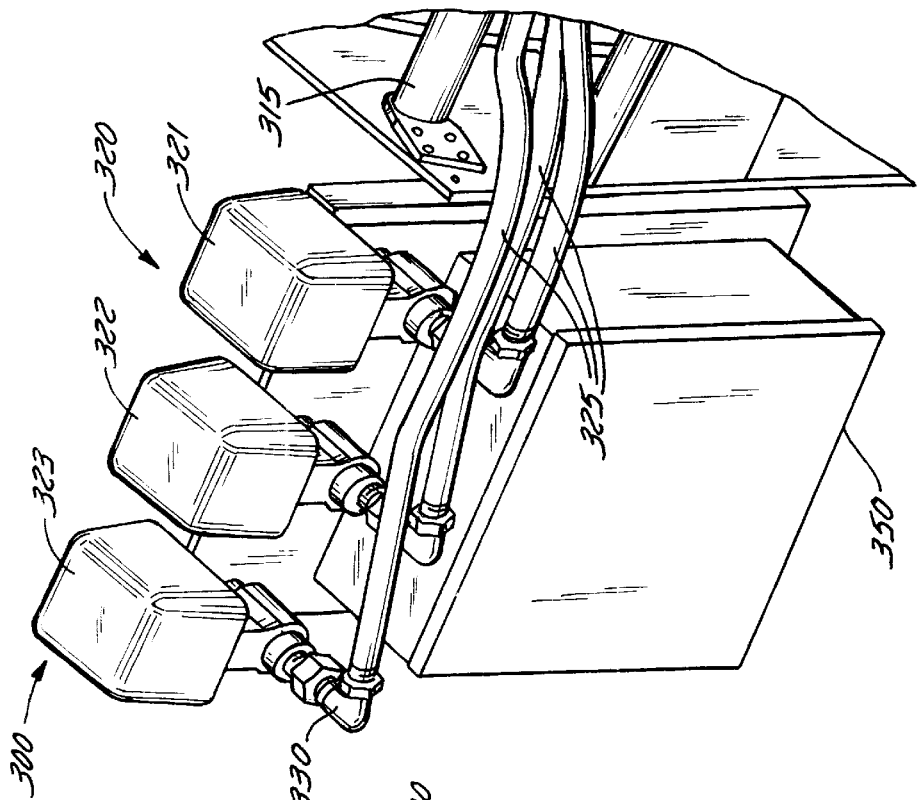
FIG. 8 is a reverse angle perspective view of an exemplary sprayer for a cylindrical wastewater screen according to a preferred embodiment.
Figure 7:
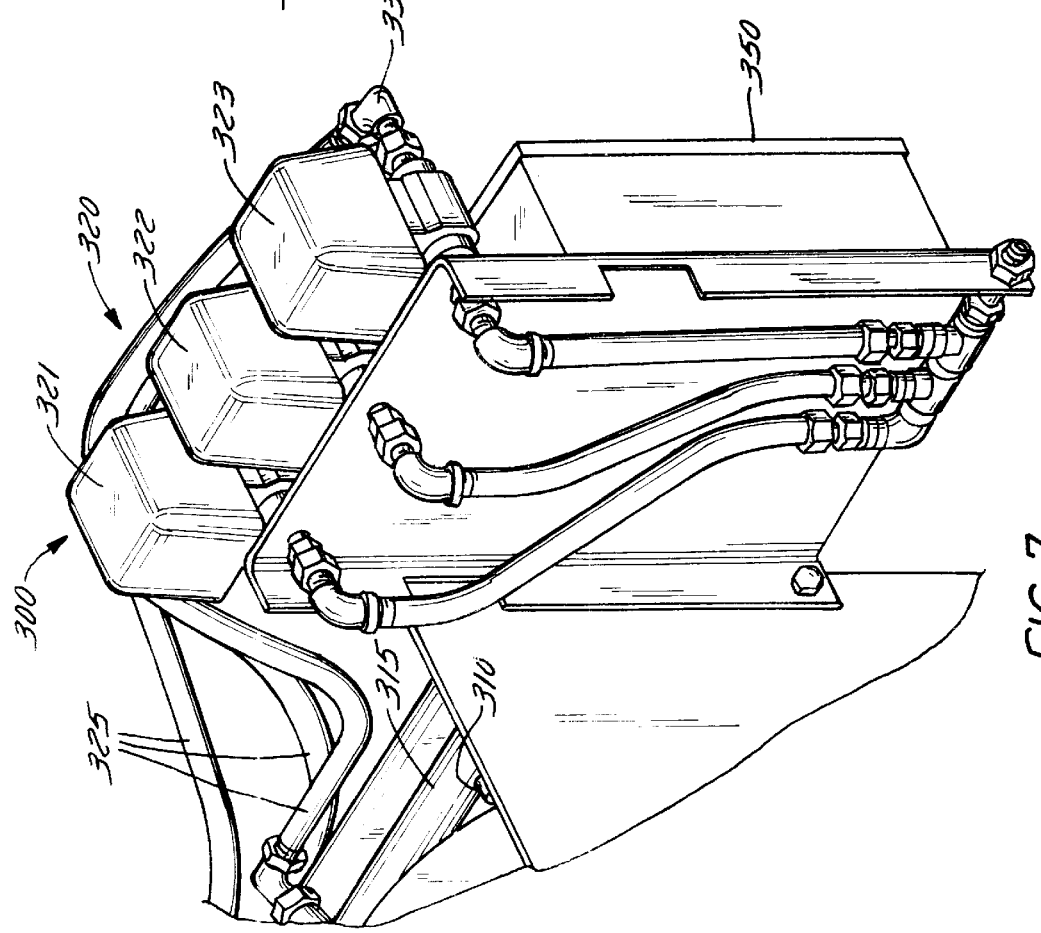
FIG. 7 is a perspective view of an exemplary sprayer for a cylindrical wastewater screen according to a preferred embodiment.

FIGS. 7 and 8 are opposite perspective views of an exemplary sprayer 300 for cylindrical wastewater screens 32 and 40 according to a preferred embodiment. FIGS. 7 and 8 illustrate the use of pipe coupling 330 for attaching the hoses 325 throughout the sprayer 300. FIGS. 7 and 8 also illustrate a control system 350 coupled to the valves 320. In operation, the control system 350 controls the actuation of the valves 320 to distribute fluid 44 to selected spray manifolds 315 and subsequently to the spray nozzles 310. Thus, different valves 320 can be actuated at different times to spray fluid 44 against the screens 32 and 40. The control system can control the order that the nozzles eject fluid and can control a duration of time that the nozzles eject fluid. The valves can open and close in a specified sequence to eject fluid from the spray nozzles to sequential areas of the screens 32 and 40.

Figure 9:
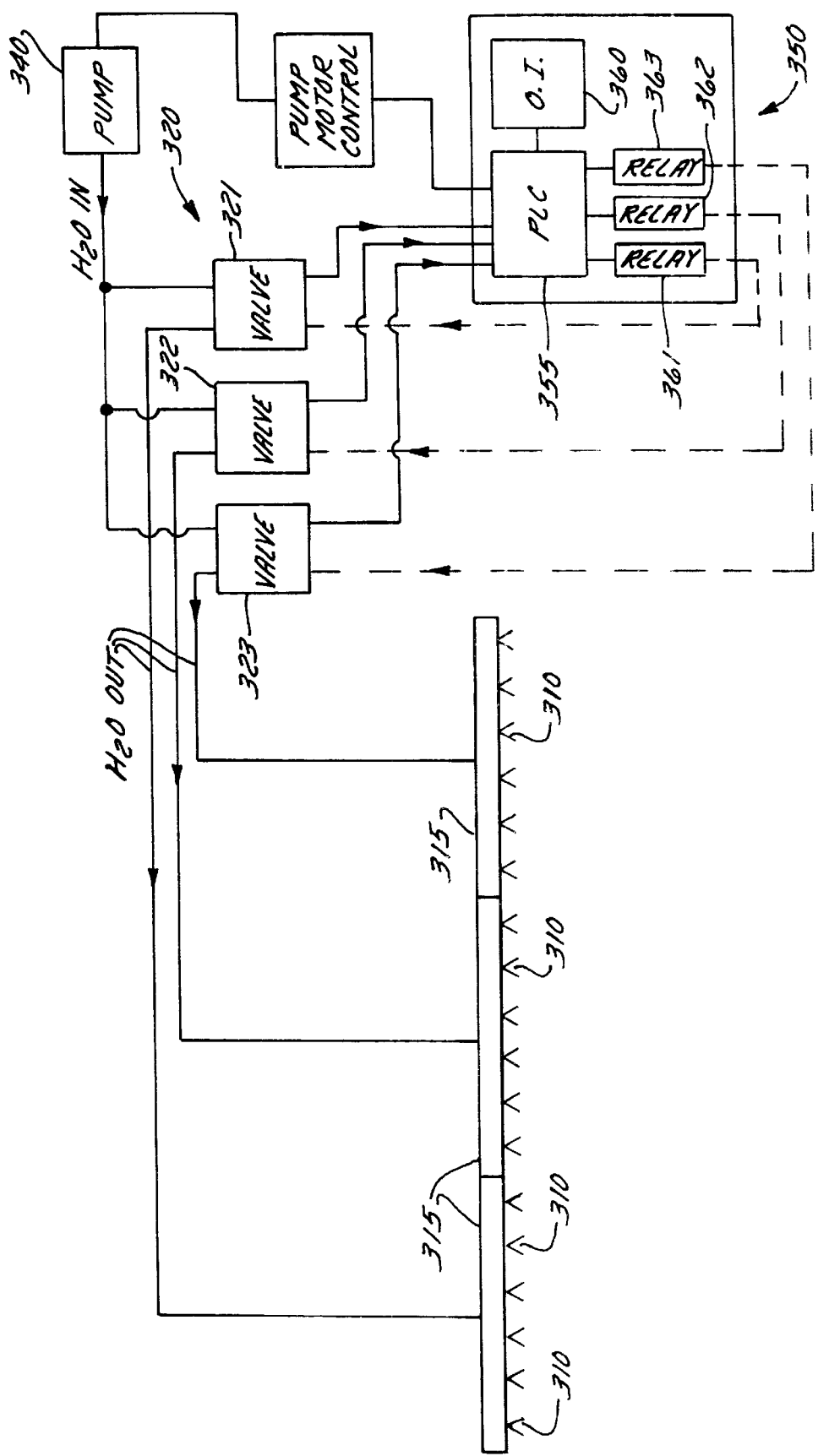
FIG. 9 is an exemplary block diagram of a system for controlling a sprayer for a cylindrical wastewater screen according to a preferred embodiment.

FIG. 9 is an exemplary block diagram of a system for controlling the sprayer 300 for a cylindrical wastewater screen according to a preferred embodiment. FIG. 9 illustrates the sprayer 300 including a pump 340 and a pump motor control 370. FIG. 9 also illustrates the control system 350 including a programmable logic controller (PLC) 355, an operator interface 360 and relays 361, 362, and 363. The operator interface 360, the relays 361-363, the pump motor control 370, and the valves 320 are coupled to the PLC 355. The pump motor control 370 is coupled to the pump 340 for controlling the pump 340. The pump 340 is coupled to the valves 320 for providing fluid 44 to the valves and subsequently to the spray manifolds 315 and spray nozzles 310.

In operation, a user can adjust a sequence pattern and timing to the PLC 355 for providing fluid 44 to sequential manifolds 315 by using the operator interface 360. The 5 PLC 355 controls the valves 320 by triggering the relays 361–363 to open and close the valves 320 in a desired sequence. The valves 320 provide a feedback signal to the PLC 355 which informs the PLC 355 of proper operation of the valves 320. Thus, the feedback signal can inform the PLC 355 of any necessary adjustments that may be made to correct the sequence and timing of the operation of the valves 320. The PLC 355 can also control the timing of operation of the pump 340 by sending appropriate signals to the pump motor control 370. Additionally, the PLC 355 can stop operation of the sprayer 300 if a valve fault is detected. All of the valves 320 can be set to open when the pump 340 is not running to act as a pressure relief for the system when the pump 340 starts back up.

The operator interface 360 displays a preset time and an elapsed time of each valve operation and an overlap time while the sprayer 300 is operating. For example, the valves can be set to operate in the order of first: valve 321, second: valve 322, and third: valve 323. Additionally, the valves 320 can be set to operate for one minute each. Furthermore, the valves 320 can have an overlap time of five seconds. The user can adjust these settings by using the operator interface 360. For example, the user can adjust the operation order, operation time, and/or the overlap time of the valves 320.

By using the sprayer 300, water usage can be minimized. For example, when three spray manifolds 310 are used, each manifold corresponding to a zone of the screens 32 and 40 can provide a necessary 10 gallons per minute when used sequentially. This provides water conservation over a situation where all manifolds are used in tandem and are providing 30 gallons per minute.

During operation, liquid at a pressure of at least about 350 pounds per square inch (psi) and no greater than about 1000 psi can be expelled from the nozzles toward the outermost screen. Where the wedgewire screen is a single cylindrical screen, liquid at a pressure of at least about 350 psi can be expelled from the nozzle at a flow rate of at least about 10 gallons per minute so that expelled liquid will pass completely through the rather small holes in one side of the screen disposed adjacent the nozzle and impact against an interior surface of the screen on an opposite side. As a result, solids clinging to the interior surface of the side of the wedgewire screen adjacent the nozzle are loosened and preferably dislodged from the screen. And solids clinging to the interior surface of the side of the screen opposite the nozzle are also loosened and dislodged from the screen. By this advantageous arrangement, cleaning of the screen is optimized, done more quickly, and with less water than in the past.

Where the screen is of double-cylinder construction, liquid at a pressure of at least about 1000 psi can be expelled from the nozzles 310 at a flow rate of at least about 6 gallons per minute so that expelled liquid will pass completely through the rather small holes or perforations in one side of the outer screen disposed adjacent the nozzles 310, will pass through the rather small holes in one side of the inner screen disposed adjacent the nozzle 42, will impact against an interior surface of the inner screen on a side opposite the nozzle, will pass through the small holes in the inner screen on the side opposite the nozzle 42, and will impact against an interior surface of the outer screen on an opposite side.

Although the nozzles 310 are shown disposed in a general horizontal position relative to the force of gravity, the nozzles 310 preferably are disposed between about an eight o'clock position and about an eleven o'clock position. Where a double-cylinder screen is used, the nozzles 310 preferably are disposed between a nine o'clock and about an eleven o'clock position. Preferably, the nozzles 310 are disposed at about a ten o'clock position to eject liquid at the same angle toward the outermost screen.

When the cleaning fluid discharged from the nozzles 310 is a gas, the nozzles 310 are located closer to the screen toward which it is pointed. Where the nozzles 310 are exteriorly disposed, the nozzles 310 are disposed no farther than about 2 inches from the outer surface of the screen toward which they are directed.

When the cleaning fluid is a gas, preferably air, the gas provided to the nozzles 310 has a pressure of at least 80 psi. In one preferred method of operation, gas is discharged from each nozzle of the system at a flow rate of at least about 25 cubic feet per minute (cfm). For particularly demanding cleaning applications, the gas has a pressure of at least 150 psi and a flow rate of at least 30 cfm.

Where gas is the cleaning fluid, the gas is provided to the nozzles 310 from a high pressure gas source. One preferred source is an air compressor, such as a rotary piston air compressor. Another preferred source is standard shop air, having a pressure of between 100 psi and 150 psi. A still further preferred gas source is a squirrel cage blower where the application involves higher volumes of air, but with lower impact force. This is particularly useful for very light product.

As a result of the aforementioned parameters and depending on the application, a preferred single drum screen can screen or filter at least about 4500 gallons per minute of wastewater. A preferred double drum screen can screen or filter at least about 3000 gallons. As a result of using the sprayer 300 of this invention, the flow of wastewater that can be screened or filtered is increased over a screen having a conventional spray arrangement. Moreover, because cleaning is more efficient, a screen equipped with a sprayer 300 of this invention is cleaned more thoroughly, decreasing downtime of the screen.

It is also to be understood that, although the foregoing description and drawings describe and illustrate in detail preferred embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims.

What is claimed is:

1. An apparatus for screening wastewater comprising:
   a frame;
   a rotatable cylindrical screen carried by the frame and having an axis of rotation and which is defined by a tubular perforate wedgewire sidewall having an interior wedgewire surface and an exterior wedgewire surface;
   a wastewater conduit having an opening disposed inside the wedgewire sidewall through which conduit effluent is discharged;
   a plurality of spray nozzles positioned along the length of the cylindrical screen from which fluid is ejected against the wedgewire sidewall to dislodge solids from the wedgewire sidewall;
   a control system coupled to the plurality of spray nozzles that controls the order that each nozzle of the plurality of spray nozzles ejects fluid and controls a duration of time that each nozzle of the plurality of nozzles ejects fluid; and
   a pump in fluid flow communication with a supply of the fluid for delivering the fluid to the plurality of spray nozzles.

2. The apparatus of claim 1 wherein the plurality of nozzles eject fluid under pressure sufficient to impinge against and pass through the outer surface of the wedgewire sidewall and then impinge against an inner surface of the wedgewire sidewall such that solids are dislodged at both regions of impingement.

3. The apparatus of claim 2 further comprising a second cylindrical screen that is comprised of a tubular perforate wedgewire sidewall wherein the fluid from the plurality of spray nozzles is under sufficient pressure that it impinges against and passes through an outer surface of the cylindrical screen, an outer surface of the second cylindrical screen, an inner surface of the second cylindrical screen, and an inner surface of an opposite side of the cylindrical screen.

4. The apparatus of claim 1 wherein the plurality of spray nozzles eject fluid at a pressure of at least about 80 to 1000 psi.

5. The apparatus of claim 1 wherein the plurality of spray nozzles eject fluid at a volume of about 5 to 20 gallons per minute based on the size of the screen and based on the water pressure supplied.

6. The apparatus of claim 5 wherein the sprayer is disposed about 4 to 6 inches away from the outer sidewall of the cylindrical screen.

7. The apparatus set forth in claim 1 wherein the wedgewire sidewall of said cylinder has openings of 10 to 20 thousands of an inch.

8. The apparatus of claim 1, wherein the plurality of spray nozzles are arranged so that the fluid ejected from the spray nozzles against the wedgewire sidewall provides complete coverage of the cylindrical screen along the axis of rotation.

9. The apparatus of claim 1, further comprising a plurality of electrically actuated valves coupled to the plurality of spray nozzles positioned along the length of the cylindrical screen, wherein the controller controls the operation of the electrically actuated values to provide fluid to the plurality of spray nozzles.

10. The apparatus of claim 9, wherein the valves open and close in sequence to eject fluid from the spray nozzles to sequential areas of the cylindrical screen.

11. The apparatus of claim 1, further comprising a plurality of spray manifolds coupled to the plurality of spray nozzles, wherein each of the plurality of spray manifolds is coupled to at least one of the plurality of spray nozzles.

12. The apparatus of claim 1, further comprising an operator interface coupled to the control system.

* * * * *